United States Patent [19]
Hendrickson

[11] Patent Number: 4,598,313
[45] Date of Patent: Jul. 1, 1986

[54] TELEVISION SIGNAL SCRAMBLING SYSTEM

[75] Inventor: Melvin C. Hendrickson, Elmhurst, Ill.

[73] Assignee: Zenith Electronics Corporation, Glenview, Ill.

[21] Appl. No.: 666,852

[22] Filed: Oct. 31, 1984

[51] Int. Cl.[4] .............................................. H04N 7/167
[52] U.S. Cl. ................................ 358/124; 358/21 V; 358/114; 358/123
[58] Field of Search ................ 358/114, 120, 124, 123

[56] References Cited
U.S. PATENT DOCUMENTS 3,982,062  9/1976  Simons .
4,002,825  1/1977  Lewis .................................. 358/123
4,081,831  3/1978  Tang et al. .......................... 358/123

Primary Examiner—Stephen C. Buczinski
Assistant Examiner—Aaron J. Lewis

[57] ABSTRACT

An encoded television signal is transmitted in the form of an inverted video component amplitude modulating an RF carrier to a selected percentage of modulation and characterized by inverted reference black and white level components. At the receiver, a decoding signal equal in frequency to and 180 degrees out of phase with the RF carrier is generated and combined with the received signal to provide a decoded television signal. The level of the decoding signal is controlled in response to the difference between the peak detected reference level signals such that the percentage of modulation of the decoded television signal is the same as that characterizing the encoded signal.

9 Claims, 5 Drawing Figures

TELEVISION SIGNAL SCRAMBLING SYSTEM

BACKGROUND OF THE INVENTION

The present invention relates generally to television signal encoding and decoding systems and particularly concerns an improvement to a technique involving video signal inversion and reinversion in the RF domain.

In subscription or pay television systems programming signals are typically transmitted, either over-the-air or through a suitable cable network, in an encoded or scrambled form rendering the broadcast video information essentially unviewable when received and reproduced by a conventional television receiver. In order to decode or unscramble the video display, each system subscriber is provided with a decoder operable for decoding the broadcast signals and for coupling the decoded signals to a conventional television receiver for viewing.

One known technique for encoding a broadcast television signal contemplates inverting the video information by adding to the television signal carrier an encoding wave which is equal in frequency to but oppositely phased and larger than the original carrier. As a result of the inversion of the video information, a conventional television receiver is incapable of synchronizing to and properly reproducing the original signal. In order to decode the broadcast signal, a decoder is provided for implementing an inverse operation wherein a decoding wave is added to the received signal, the decoding wave having a frequency equal to but again oppositely phased with respect to the received carrier. The thusly reinverted signal may subsequently be coupled to a conventional television receiver for viewing by the subscriber. U.S. Pat. No. 3,982,062 to Simons is exemplary of such RF domain inversion and reinversion systems.

In systems of the foregoing type, it has heretofore been extremely difficult to maintain the desired depth or percentage of modulation in the decoded signal. In particular, in order to faithfully reproduce the original signal it is desired that the percentage of modulation characterizing the encoded broadcast signal be substantially maintained in the decoded signal. Deviations in the percentage of modulation of the decoded signal from the nominal level characterizing the encoded broadcast signal lead to undesired compression or expansion of the decoded signal and thereby to a distorted image when the signal is reproduced by the subscriber's television receiver.

The percentage of modulation of the decoded signal is largely a function of the level of the decoding wave combined with the received signal in the decoder. The level of the decoding wave is therefore normally fixed by suitably setting the gain of an amplifier or attenuator so that the percentage of modulation of the decoded signal will be the same as that characterizing the encoded broadcast signal. However, with time the setting of the amplifier or attenuator will tend to drift varying the level of the decoding wave and thereby the percentage of modulation of the decoded signal, such variations leading to the image distortions described above.

OBJECTS OF THE INVENTION

It is therefore a basic object of the present invention to provide an improved television signal encoding and decoding system.

It is a further object of the invention to provide an improved system for effecting video signal inversion and reinversion in the RF domain.

It is yet a further object of the invention to provide an RF domain video signal inversion system wherein the percentage of modulation characterizing the encoded broadcast signal is substantially maintained in the decoded signal.

BRIEF DESCRIPTION OF THE DRAWINGS

The features of the invention which are believed to be novel are set forth with particularlity in the appended claims. The invention, together with its objects and the advantages thereof may best be understood by reference to the following description taken in conjunction with the accompanying drawings in which:

DESCRIPTION OF THE PREFERRED EMBODIMENT

Figure 1:
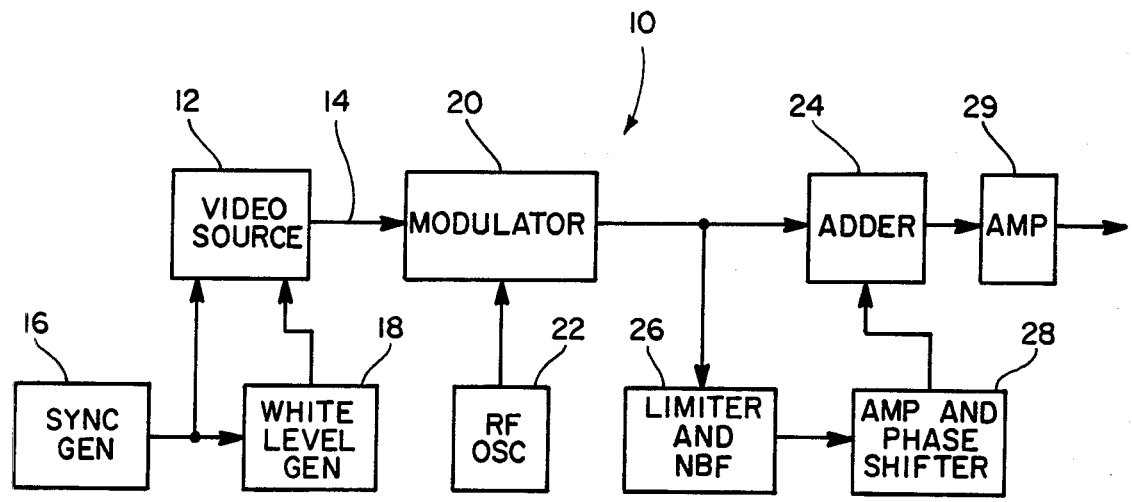
FIG. 1 is a block diagram of a television signal transmitter embodying the principles of the present invention.
Figure 2:
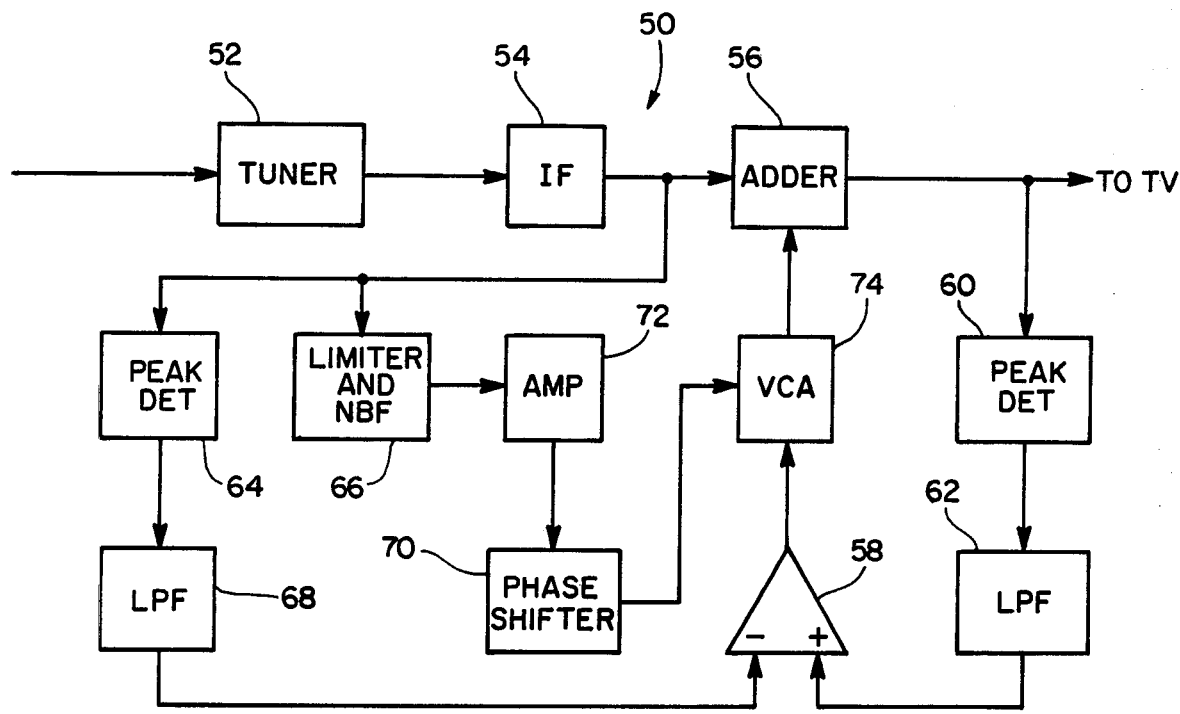
FIG. 2 is a block diagram of a television signal decoder embodying the principles of the present invention.

Referring now to the drawings, and in particular to FIGS. 1 and 2, there is shown a television signal transmitter 10 and a television signal receiver 50 constructed according to the present invention. As will be explained in further detail hereinafter, transmitter 10 broadcasts a television signal whose video component has been inverted through signal processing techniques in the RF domain and which is characterized by a selected percentage of modulation defined by reference black and white level signal components. Receiver 50 is adapted for receiving the transmitted signal and for providing, in response to the reference black and white level components, a decoded, i.e. reinverted, signal whose percentage of modulation is substantially equal to that of the originally broadcast signal.

Figure 3A:
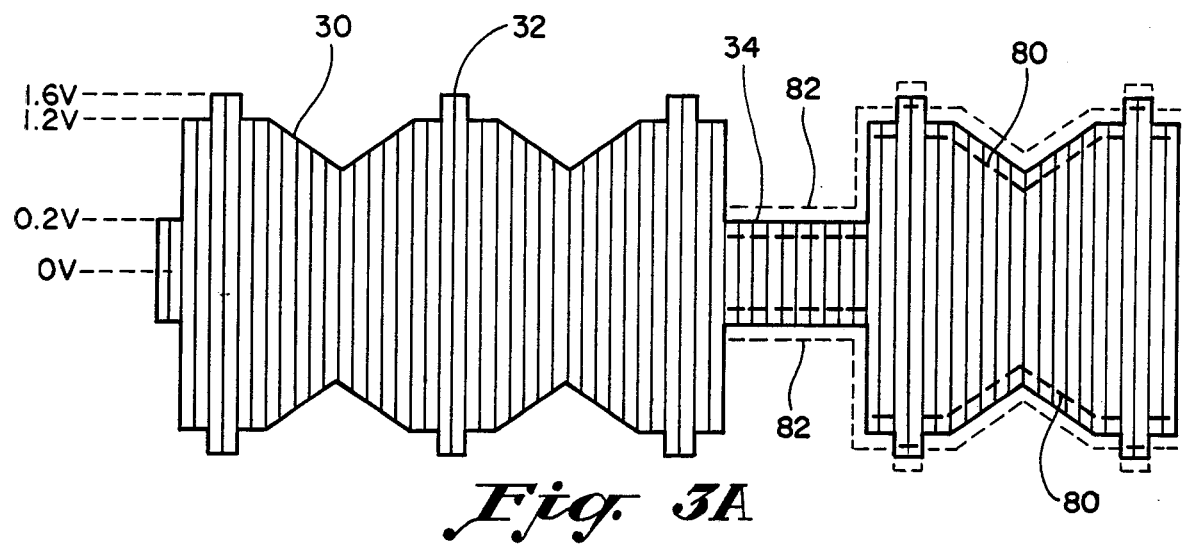
FIGS. 3A-3C are waveform diagrams illustrating the operation of the system of the present invention.

With more specific reference to FIG. 1, transmitter 10 comprises a video signal source 12 providing a composite baseband video signal on an output 14 corresponding to the modulation envelope 30 of the signal illustrated in FIG. 3A. This composite baseband video signal includes conventional sync components including horizontal sync pulses 32 derived from a sync generator 16. The baseband signal also includes a white level component 34 derived from a white level generator 18 operated in response to sync generator 16. White level component 34 occupies substantially a complete horizontal line preferably located in the vertical blanking interval of the signal. The signal levels defined by the tips of the horizontal sync pulses 32 and the white level signal component 34 will be respectively referred to herein as reference black and white level signal components.

Figure 3B:
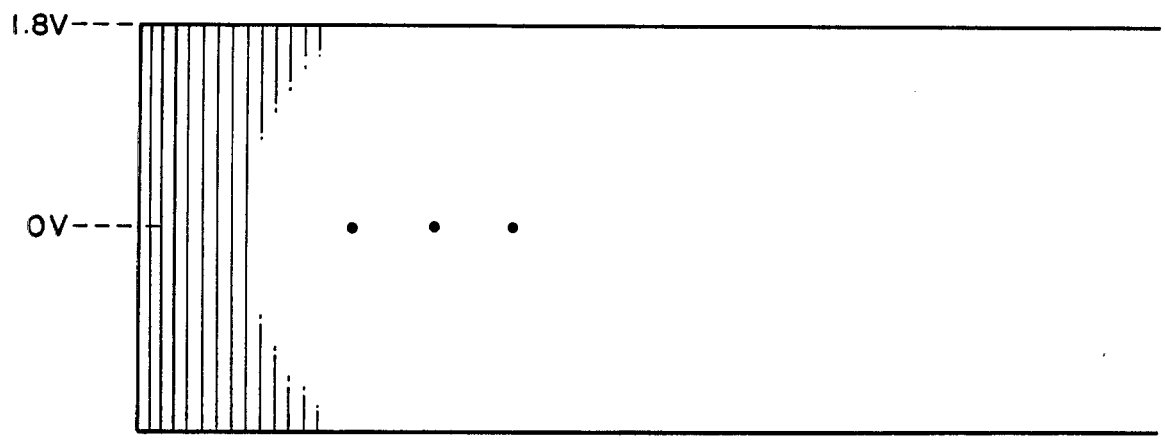

The baseband video signal developed on output 14 of video source 12 is applied to one input of a modulator 20 whose other input is supplied with an RF carrier signal from an oscillator 22. In a manner well known in the art, modulator 20 amplitude modulates the RF carrier provided by oscillator 22 with the baseband signal 30 to produce the amplitude modulated RF signal illustrated in FIG. 3A. This signal is then applied to one input of an adder 24 and also to a limiter and narrow band filter network 26. Network 26 produces an amplitude limited or unmodulated RF output at the carrier frequency for application to the input of an amplifier and phase shift network 28. Network 28 is designed for processing the unmodulated RF output provided by network 26 for coupling an encoding signal to the second input of adder 24. The encoding signal, as represented by the waveform of FIG. 3B, comprises an unmodulated RF signal having a frequency equal to and a phase opposite that of the carrier of the amplitude modulated signal developed by modulator 20. Also, the level of the encoding signal is precisely controlled to a value somewhat larger than that of the amplitude modulated signal provided by modulator 20.

Figure 3C:
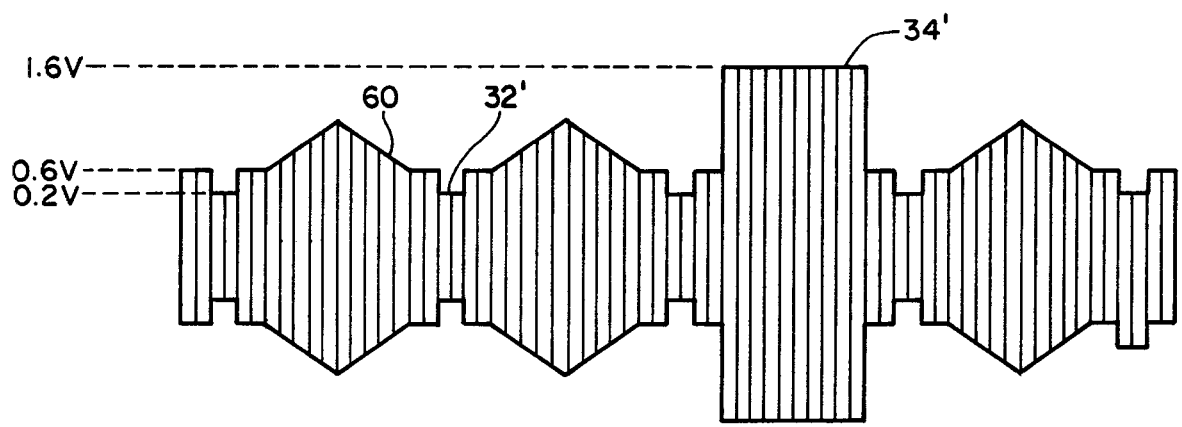

The effect of combining the amplitude modulated signal provided by modulator 20 (FIG. 3A) with the somewhat larger oppositely phased encoding signal provided by network 28 (FIG. 3B) in adder 24 is illustrated by the waveform of FIG. 3C. It will be observed that this waveform, hereinafter referred to as the encoded signal, represents an amplitude modulated Rf carrier whose modulation envelope 60 corresponds to an inverted representation of the modulation envelope 30 of the original signal. The encoded signal developed by adder 24 is applied to a power amplifier 29 for subsequent transmission.

The depth or percentage of modulation of an amplitude modulated signal such as illustrated in FIGS. 3A and 3C is given by the expression:

$$\text{Percent of modulation} = [(E\max - E\min)/(E\max + E\min)] \times 100.$$

With reference to the encoded signal illustrated in FIG. 3C, it will be seen that Emax corresponds to the inverted reference white level signal component 34' (1.6 v) and that Emin corresponds to the inverted reference black level signal component 32' (0.2 v). As a consequence, the encoded signal is characterized by a percent of modulation equal to about 78 percent (1.4/1.8). It will be appreciated that the percent of modulation of the uninverted signal originally developed by modulator 20 is also 78 percent. The maintenance of the percent of modulation between the uninverted and inverted waveforms of FIGS. 3A and 3C in transmitter 10 is made possible by the highly accurate and expensive transmitter circuits.

The decoder 50 of FIG. 2 is adapted for receiving and decoding the encoded broadcast signal of FIG. 3C and for coupling the decoded signal to a television receiver (not shown) for viewing. In particular, decoder 50 is adapted for developing a decoded signal which is substantially identical to the uninverted RF signal of FIG. 3A and whose percent of modulation is substantially equal to the percent of modulation characterizing the received encoded signal of FIG. 3C (about 78 percent in the present example).

Decoder 50 comprises a tuner 52 for receiving and converting the encoded braodcast RF signal of FIG. 3C to a selected intermediate frequency signal. For convenience, the selected intermediate frequency preferably corresponds to television channel 3 or 4. The intermediate frequency signal is processed by an intermediate frequency circuit 54 and coupled therefrom to one input of an adder 56. The output of adder 56, which comprises the decoded RF television signal on channel 3/4, is coupled to the television receiver of a subscriber and also through a feedback path to the noninverting input of a differential amplifier 58. The feedback path comprises a peak detector 60 and a lowpass filter 62. Peak detector 60 preferably comprises a network including a diode and a storage capacitor, the diode being poled for enabling peak detecting of the reference black level signal component (i.e. the horizontal sync pulse tips) 32 of the decoded signal. Since the reference black level signal component occurs at the horizontal rate, lowpass filter 62 is preferably characterized by a long time constant relative to the horizontal scanning rate. It will therefore be appreciated that the feedback path comprising peak detector 60 and lowpass filter 62 provides a DC signal to the noninverting input of differential amplifier 58 representing the reference black level signal component or horizontal sync pulse tips 32 of the decoded signal.

The intermediate frequency signal developed by intermediate frequency circuit 54 also couples the encoded signal to the input of a second peak detector 64 and to the input of a limiter and narrow band filter network 66. The output of peak detector 64 is coupled by a lowpass filter 68 to the inverting input of differential amplifier 58. Peak detector 64 also preferably comprises a network including a diode and a storage capacitor, the diode being poled for enabling peak detecting of the inverted reference white level signal component 34' of the encoded signal of FIG. 3C. Since the inverted reference white level signal component occurs at the vertical rate, lowpass filter 68 is preferably characterized by a long time constant relative to the vertical field rate. As a consequence, lowpass filter 68 provides a DC signal to the inverting input of differential amplifier 58 representing the inverted reference white level signal component 34' of the received encoded signal.

Limiter and narrow band filter 66 develops an output comprising an unmodulated signal at the selected intermediate frequency which is applied to the input of a phase shifter 70 by an amplifier 72. Phase shifter 70 develops an output decoding signal which is applied to one input of a voltage controlled attenuator 74, the second input of attenuator 74 receiving a control signal from the output of differential amplifier 58. The output of the attenuator is supplied to the second input of adder 56. Amplifier 72 and phase shifter 70 are operable such that the decoding signal coupled to attenuator 74 is 180 degrees out of phase with respect to and somewhat larger in amplitude than the encoded intermediate frequency signal developed by intermediate frequency circuit 54. Thus, for purposes of illustration, the encoded intermediate frequency signal applied to the first input of adder 56 can be represented by the waveform of FIG. 3C and the decoding signal applied to the second input of the adder by the waveform of FIG. 3B. Due to the oppositely phased nature of these two signals, it will be appreciated that the output of adder 56 will comprise a reinverted or decoded representation of the received signal at the intermediate frequency as represented by the waveform of FIG. 3A. As will be explained in further detail below, attenuator 74 is operated in response to the output of differential amplifier 58 to suitably control the level of the decoding signal applied to adder 56 so as to maintain equality between the percent of modulation characterizing the decoded signal developed at the output of adder 56 and the received encoded signal. As previously explained, this is necessary in order to faithfully reproduce the televised image in response to the decoded signal.

More particularly, with reference to the signal waveforms of FIGS. 3A-3C, assume initially that the level of the decoding signal supplied to adder 56 by attenuator 74 has a peak level of 1.8 volts as shown in FIG. 3B. In this case, the percent of modulation characterizing the received encoded signal as represented by the intermediate frequency waveform of FIG. 3C will be equal to that of the decoded signal as represented by the waveform of FIG. 3A, about 78 percent for the exemplary signal levels shown. Now, assume that for whatever reason, such as the drifting of attenuator 74, the peak level of the decoding signal drops below 1.8 volts, for example to 1.7 volts. As a consequence, the decoded signal represented by the waveform of FIG. 3A will be compressed by 0.2 volts as indicated by dotted line 80. This signal compression results in an increase in the percent of modulation of the decoded signal from the desired 78 percent value to about 87 percent (1.4/1.6). In order to correct or compensate for this condition, the decreased peak detected horizontal sync tip level of the decoded signal, i.e. 1.5 volts, is fed back by lowpass filter 62 to the noninverting input of differential amplifier 58 where it is compared to the 1.6 volt level of the peak detected inverted white level reference component 34' applied to the inverting input of the amplifier by lowpass filter 68. Differential amplifier 58 therefore produces an output control signal of −0.1 volts which reduces the attenuation characterizing attenuator 74 by a sufficient amount to allow the decoding signal of FIG. 3B to rise back to the 1.8 volt level for re-establishing the desired percent of modulation of the decoded signal.

On the other hand, assume that the peak level of the decoding signal rises above the nominal 1.8 volt level to, for example, 1.9 volts. In this case, the decoded signal represented by the waveform of FIG. 3A will be expanded by 0.2 volts as indicated by dotted line 82. This signal expansion results in a decrease in the percent of modulation of the decoded signal from the desired value of 78 percent to 70 percent. To compensate for this condition, the increased peak detected horizontal sync tip level of the decoded signal, i.e. 1.7 volts, is fed back to the noninverting input of differential amplifier 58 where it is compared to the 1.6 volt level of the peak detected inverted white level reference component 34' applied to the inverting input of the amplifier. Differential amplifier 58 now produces an output control signal of +0.1 volts which increases the attenuation characterizing attenuator 74 by a sufficient amount to decrease the level of the decoding signal of FIG. 3B to the nominal 1.8 volt level for re-establishing the desired percent of modulation of the decoded signal.

What has been therefore been shown is an improved system for decoding an inverted television signal in the RF domain by combining the received signal with an oppositely phased decoding signal whose level is controlled in response to reference black and inverted white level components of the decoded and received signals respectively to maintain a desired percent of modulation in the decoded signal.

While a particular embodiment of the invention has been shown and described, it will be obvious to those skilled in the art that changes and modifications may be made without departing from the invention in its broader aspects. Therefore, the aim in the appended claims is to cover all such changes and modifications as fall within the true spirit and scope of the invention.

What is claimed is:

1. A television signal transmission system comprising:
    means for transmitting an encoded television signal comprising an inverted video component amplitude modulating an RF carrier to a selected percentage of modulation, said encoded television signal further comprising inverted reference black and white level components;
    means for receiving the transmitted signal;
    means for generating a decoding signal equal in frequency to and 180 degrees out of phase with said RF carrier; and
    means responsive to the difference between the inverted reference white level component and the reinverted reference black level component for combining said decoding signal with said received signal so as to develop a decoded RF television signal characterized by said selected percentage of modulation.

2. A television signal transmission system according to claim 1 including means for detecting the inverted reference white level components in response to said received signal and means for detecting the reinverted reference black level component in response to said decoded signal.

3. A television signal transmission system according to claim 2 including means for developing a control signal reflecting the difference between said detected reference level components and means responsive to said control signal for controlling the level of said decoding signal.

4. A television signal transmission system according to claim 2 wherein each of said means for detecting comprises a peak detector and a low pass filter.

5. A television signal transmission system according to claim 3 wherein said means for controlling comprises a voltage controlled attenuator for controllably attenuating the level of said decoding signal in response to said control signal.

6. A television signal transmission system comprising:
    means for transmitting an encoded television signal comprising an inverted video component amplitude modulating an RF carrier to a selected percentage of modulation, said encoded television signal further comprising inverted reference black and white level components;
    means for receiving the transmitted signal;
    means for generating a decoding signal equal in frequency to and 180 degrees out of phase with said RF carrier;
    means operable in response to a control signal for adjusting the level of said decoding signal;
    means for combining said level adjusted decoding signal with said received signal for reinverting the video component for developing a decoded RF television signal;
    means responsive to said received signal for peak detecting said inverted reference white level component;
    means responsive to said decoded signal for peak detecting the reinverted reference black level component; and
    means responsive to the difference between said peak detected reference components for developing said control signal for operating said means for adjusting so as to adjust the level of said decoding signal for causing said decoded RF television signal to be characterized by said selected percentage of modulation.

7. A television signal transmission system according to claim 6 wherein said means for adjusting comprises a voltage controlled attenuator.

8. A television signal transmission system according to claim 6 wherein said means for developing said control signal comprises a differential amplifier.

9. A television signal transmission system according to claim 8 wherein said reinverted reference black level component comprises the horizontal sync tip level of said decoded signal and wherein said reference white level component comprises an inverted white level signal characterizing at least a portion of a horizontal line of said encoded television signal.

* * * * *